(12) United States Patent  
Tasker (10) Patent No.: US 8,694,054 B2  
(45) Date of Patent: Apr. 8, 2014

(54) WIRELESS CELL PHONE HEADSET RELAY (75) Inventor: Michael Edric Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 265 days.

(21) Appl. No.: 13/228,236

(22) Filed: Sep. 8, 2011

(65) Prior Publication Data

US 2013/0065637 A1    Mar. 14, 2013

(51) Int. Cl.  
*H04W 88/02* (2009.01)  
*H04W 24/02* (2009.01)

(52) U.S. Cl.  
USPC ..... 455/557; 455/41.1; 455/553.1; 455/552.1

(58) Field of Classification Search  
USPC ............ 455/553.1, 15, 11.1, 420, 442, 41.1, 455/41.2, 552.1, 557, 556.2, 569.1, 520, 455/416, 417  
See application file for complete search history.

(56) References Cited

U.S. PATENT DOCUMENTS

| | | | |
|---|---|---|---|
| 2008/0261529 A1* | 10/2008 | Rosenblatt | 455/41.3 |
| 2010/0189084 A1* | 7/2010 | Chen et al. | 370/338 |
| 2012/0069838 A1* | 3/2012 | Sarkar et al. | 370/352 |

* cited by examiner

*Primary Examiner* — John J Lee  
(74) *Attorney, Agent, or Firm* — Tucker Ellis LLP (57) ABSTRACT In example embodiment, a BLUETOOTH application on a cell phone acts as an audio proxy and enables shared use of the cell phone's BLUETOOTH headset between the cell phone and a BLUETOOTH enabled desk phone. When a telephone communication is established via the desk phone, audio data is sent from the desk phone to the cell phone, and the cell phone relays the audio data to the headset. Audio data from the headset is relayed by the cell phone to the desk phone.

20 Claims, 4 Drawing Sheets

WIRELESS CELL PHONE HEADSET RELAY

TECHNICAL FIELD

The present disclosure relates generally to sharing a telephone user interface device such as a headset that employs a personal area network such as BLUETOOTH with multiple telephonic communication devices.

BACKGROUND

BLUETOOTH headsets are common cell phone accessories. Some Internet Protocol (IP) phones also offer BLUETOOTH headset support. This usually leaves the BLUETOOTH headset user with a choice to either pair the headset with their cell phone, pair with their desk phone, or to have 2 separate headsets, one for use with their cell phone and one for use with their desk phone.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, a personal area network, for example BLUETOOTH, application on a cell phone that acts as an audio proxy and enables shared use of a headset associated with the cell phone with a desk phone. In other embodiments, the cell phone may use other protocols such as a wireless local area network protocol to share the headset with the desk phone.

In accordance with an example embodiment, there is disclosed herein, a personal area network, for example BLUETOOTH, gateway software component installed within a desk phone that enables the desk phone to associate with a wireless headset. The headset may be coupled with the desk phone, or the gateway protocol software component can communicate with the headset via relay software in an associated cell phone.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a BLUETOOTH to WIFI relay via the user's WIFI capable cell phone, such that the BLUETOOTH headset is simultaneously able to make and receive calls via the cell phone and user's desk phone. The BLUETOOTH headset is paired with the cell phone, and the cell phone then connects via WIFI and/or BLUETOOTH to the user's desk phone.

An example embodiment employs a separate physical WIFI to BLUETOOTH adapter to complete the connection to the phone's BLUETOOTH interface. This embodiment will work with any BLUETOOTH enabled desk phone. The adapter may optionally be powered by an available USB port on the desk phone, with batteries, or an AC adapter.

In an example embodiment, a Bluetooth gateway software component installed within a VoIP desk phone, sharing the VoIP desk phone's network interface (wired or wireless) and connecting to the VoIP desk phone's internal headset interface (wired or Bluetooth), avoiding the need for a dedicated WI-FI to Bluetooth conversion within the VoIP desk phone. The gateway software component communicates directly over the VoIP desk phone's network interface with the Bluetooth relay software within the cell phone.

The BLUETOOTH relay software application in the cell phone provides a user interface to control which phone (cell or desk) is actively sending/receiving audio from the BLUETOOTH headset. This aids in usability over a dual paired BLUETOOTH headset where integrating the option control to select which phone is actively sending/receiving audio into a headset is difficult.

An example embodiment described herein allows the contact and voice dialing capabilities of the cell phone to be used to make calls via the desk phone. The relay software is capable of making concurrent calls via the cell and desk phone which can facilitate a 3-way conference call, with audio mixing taking place within the cell phone.

Figure 1:
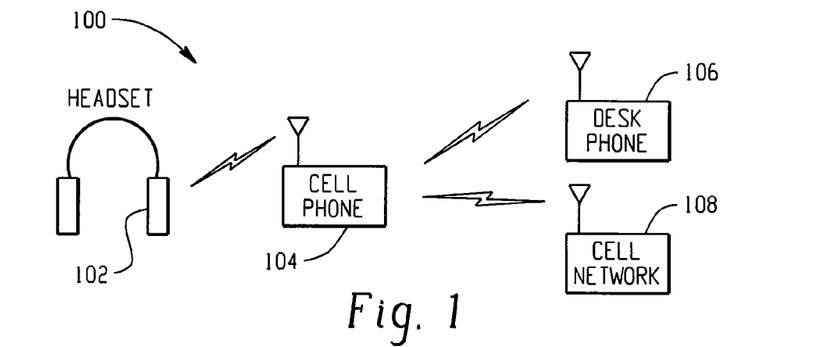
FIG. 1 is a block diagram illustrating an example of a headset coupled with a cell phone that can establish telephonic communications either through a cellular network or through an external telephonic device.

FIG. 1 is a block diagram of a system 100 illustrating an example of a headset 102 coupled with a wireless mobile device such as a cell phone 104 that can establish telephonic communications either through a cellular network 108 or through an external telephonic device such as a desk phone 106 with a wireless interface. In an example embodiment, the cell phone 104 employs a personal area network protocol (PAN) such as BLUETOOTH for communicating with the headset 102. The cell phone 104 also employs a PAN protocol for communicating with the desk phone 106. In particular embodiments, the same PAN protocol may be employed by the cell phone 104 for communicating with the headset 102 and the desk phone 106. Although the same PAN is used, different sessions may be established with each device, e.g., a first session is established for communicating with the headset 102 and a second session is established for communicating with the desk phone 106.

When the cell phone 104 establishes telephonic communications with cell network 108, audio data from the call is relayed to headset 102. The cell phone 104 can also use a PAN session with the desk phone 106 for establishing a call through the desk phone. In this embodiment, the desk phone 106 would perform call setup and audio data from the desk phone 106 would be relayed by the cell phone 104 to headset 102. While telephonic communications are established via the desk phone 106, audio data from headset 102 are relayed by cell phone 104 to desk phone 106.

Figure 4:
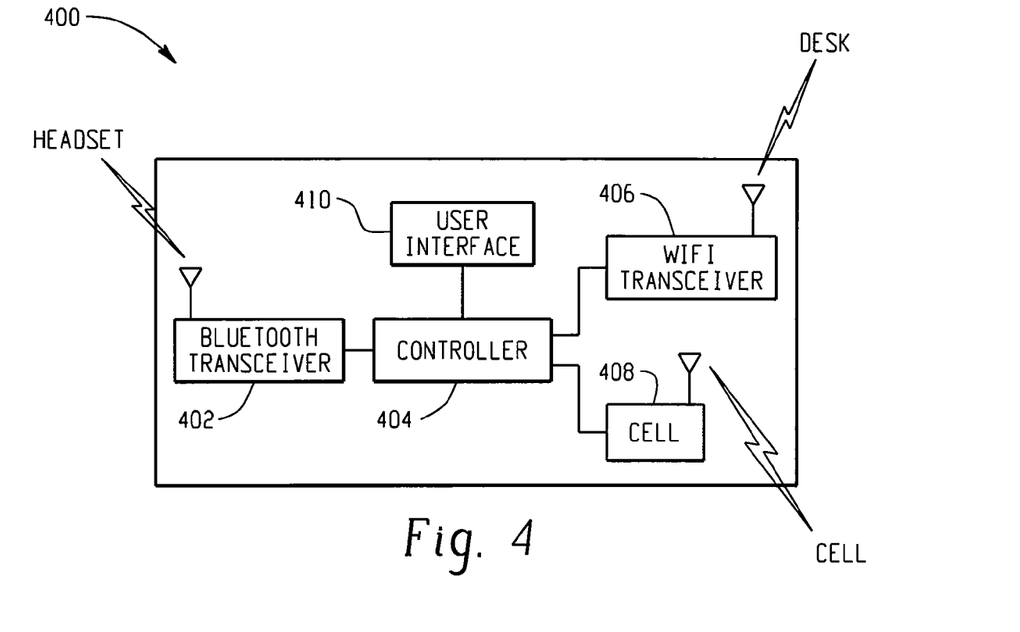
FIG. 4 is a block diagram of a mobile wireless telephone device with a cellular transceiver and a wireless local area network transceiver for establishing a telephone call.

In an example embodiment, the cell phone 104 further comprises a user interface (not shown, see e.g., FIG. 4). This can allow the user of the cell phone to select whether telephonic communications should be established using the cellular telephone interface or through the external telephonic device.

In an example embodiment, the cell phone 104 determines congestion on a channel associated with the personal area network (e.g., BLUETOOTH) interface. The cell phone 104 may elect to make the telephone call via the cellular network 108 responsive to determining congestion on the channel associated with the personal area network is above a predefined threshold.

In an example embedment, the cell phone 104 elects to make telephone calls via the desk phone 106 when a connection to the desk phone is available. This can save on cellular air time. This may also save the cell phone's 104 battery power in situations where the personal area network interface uses less power than the cellular telephone interface.

In an example embodiment, the cell phone 104 is further capable to communicate with a wireless local area network (WLAN) such as WI-FI (the Institute of Electrical and Electronic Engineers "IEEE" 802.11 standard). Thus the cell phone may communicate using the cellular network 108, or may use either a personal area network or wireless local area network to communicate with the desk phone 106 for making and receiving telephone calls.

While the cell phone 104 is communicating with the desk phone 106 over the wireless local area network, audio data from the desk phone 106 may be received by the cell phone 104 via the wireless local area network, which then forwards the audio data to the headset 102 via a personal area network connection. Audio data from headset 102 may be sent to the cell phone 104 over a personal area connection, and the cell phone relays the audio data to the desk phone 106 over the wireless local area network.

In an example embodiment, the cell phone 104 by default employs a connection to desk phone 106 that uses the least amount of power. For example, if the personal area network uses the least amount of power, then a personal area network is employed to communicate with the desk phone 106 whenever available. If the personal area network connection is unavailable, the cell phone 104 employs the wireless local area network to communicate with the desk phone 106. However, if the congestion is above a certain threshold, and/or the personal area network connection is unavailable, the cell phone 104 switches to the wireless local area network to communicate with the desk phone 106.

In an example embodiment, the cell phone 104 may communicate directly with the desk phone 106 over the wireless local area network, or may associate with an access point (AP) and communicate with the desk phone 106 over a distribution network, for example using Voice over Internet Protocol "VoIP" communications may be established over the Internet or any suitable IP network. In particular embodiments, a virtual private network (VPN) is employed when communications between the cell phone 104 and desk phone 106 employ an AP and a distribution network. For example, a user at the office can use the personal area network (e.g., BLUETOOTH) to connect the headset 102 to the desk phone 106 while the user is near his desk. However, as the user walks around the office, the user can then use the wireless local area network (e.g., WI-FI) to use the headset 102 with the desk phone 106. If an unsecured and/or un-trusted network is between the AP and the desk phone 106, a VPN connection can be established between the cell phone 104 and the desk phone 106.

In an example embodiment, the desk phone 106 may employ a personal area network for communicating with headset 102. If the headset 102 is coupled to the cell phone 104, the desk phone 106 may use the personal area network to communicate with the cell phone 104 which relays data to the headset 102. In particular embodiments, the desk phone 106 may employ a personal area network for communicating with headset 102 and a wireless local area network for communicating with other devices, such as the cell phone 104. Coupling the headset 102 to the cell phone 104 and coupling the cell phone 104 to the desk phone 106 over a wireless local area network can allow the desk phone 106 to communicate with the headset 102 over greater distances.

Figure 2:
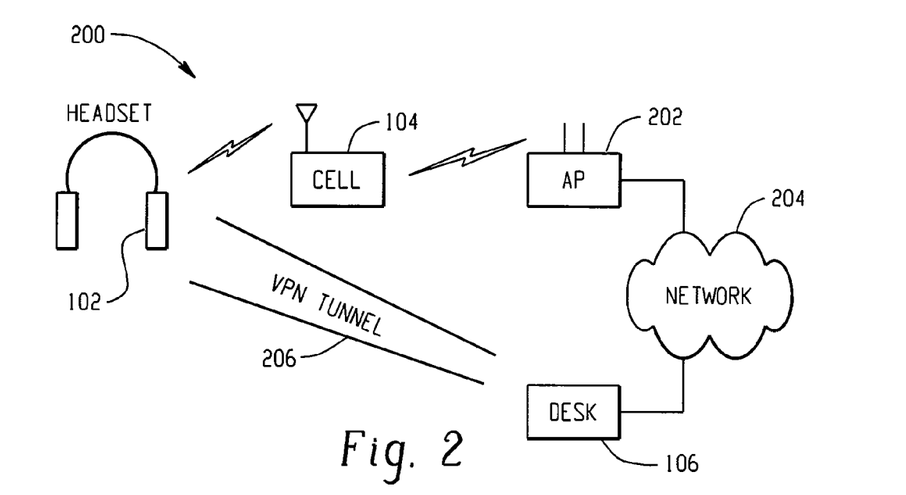
FIG. 2 is a block diagram illustrating an example of a headset coupled with a cellular telephone establishing a virtual private network connection through an access point with an external telephonic device.

FIG. 2 is a block diagram illustrating an example of coupling a headset 102 with a cellular telephone 104 that establishes a virtual private network (VPN) connection through an access point AP 202 with the external telephonic device, e.g., desk phone 106. In the illustrated example, AP 202 communicates over a distribution network (such as the Internet or a Local Area Network "LAN") 204 with desk phone 106. This can allow a user to use the headset 102 to establish telephonic communications using the desk phone 106 when there is an unsecured and/or un-trusted network in the connection between the cell phone 104 and the desk phone 106.

Figure 3:
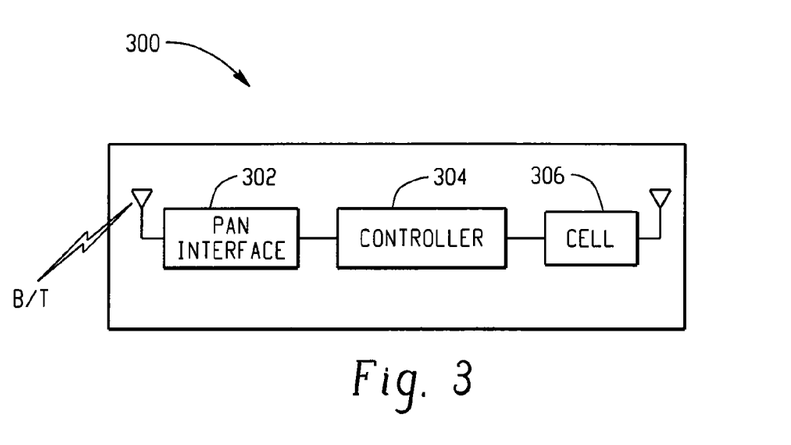
FIG. 3 is a block diagram of a mobile wireless telephone device capable of operating in accordance with an example embodiment.

FIG. 3 is a block diagram of a mobile wireless telephone device 300 capable of operating in accordance with an example embodiment. Mobile wireless telephone device 300 comprises a personal area network (PAN) interface 302 for communicating over a personal area network such as BLUETOOTH, and a cellular interface 306 for communicating over a cellular telephone network. Controller 304 is coupled with personal area network interface 302 and cellular telephone interface 306 and is operable to send and/or receive data to/from personal area network interface 302 and cellular telephone interface 306. Controller 304 suitably comprises logic for performing the functionality described herein. "Logic", as used herein, includes but is not limited to hardware, firmware, software and/or combinations of each to perform a function (s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/ programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, personal area network interface 302 may be employed to communicate with an external telephonic device (not shown, see e.g., desk phone 106 in FIGS. 1 and 2). For example, a BLUETOOTH interface may pair with a headset (not shown, see e.g., headset 102 in FIGS. 1 and 2) and establish a first session for communications, and the BLUETOOTH interface may pair with a desk phone and communicate in a second session. In particular embodiments, multiple personal area network (e.g., BLUETOOTH) interfaces may be employed. For example, one BLUETOOTH interface for communicating with a headset and another BLUETOOTH interface for communicating with a desk phone.

In an example embodiment, the controller 304 is operable to communicate with a headset and with an external telephonic device via the personal area network (e.g., BLUETOOTH) interface 302. The controller 304 is operable to selectively establish telephonic communications with either the cellular telephone interface 306, or through the external telephonic device via the personal area network interface 302. In an example embodiment, if a single personal area network interface is employed for communicating with a headset and a desk phone, the personal area network interface 302 communicates with the headset in a first session and with the external telephonic device in a second session. Data from the telephonic communications, for example audio data, whether established through a desk phone coupled with the personal area network interface 304 or through the cellular interface 306, are routed by the controller 304 to the headset via the personal area network interface 302.

In an example embodiment, the controller 304 is coupled with a user interface (not shown, see e.g., user interface 410 in FIG. 4) that enables an associated user to select whether to make a phone call through the desk phone or through the cell network. The controller 304 receives data representative of the selection from the user interface and makes the call accordingly. The user interface may also output audio, visual, and or other signals such as motion, to indicate to a user when a call is being received by either the cell phone, the desk phone, or both the cell phone and the desk phone, and allow the associated user to select whether to answer the call, or in the case of multiple calls, which call to select.

In an example embodiment, communications on the personal area network via the personal area network interface 302 use less power than communications using the cellular interface 306. To save power, by default the controller 304 selects the personal area network interface 302 for telephonic communications when available. However, if the controller 304 determines that congestion on a channel associated with the personal area network interface is above a predetermined threshold, the controller 304 selects the cellular telephone interlace 306 to establish telephonic communications.

FIG. 4 is a block diagram of a mobile wireless telephonic device 400 with a cellular transceiver 408 and a wireless local area network (e.g., WI-FI) transceiver 406 that can communicate with an external telephonic device (not shown, see e.g., desk phone 106 in FIGS. 1 and 2) for establishing telephonic communications. The mobile wireless telephone device 400 further comprises a personal area network interface 302 for communicating with a headset; however, in particular embodiments, the personal area network interlace 302 may also be employed for communicating with an external telephonic device such as a desk phone for establishing telephonic communications. In particular embodiments, personal area network (BLUETOOTH in the illustrated example) transceiver 402 may also be used to establish communications with an external telephonic device such as a desk phone and a headset communicatively coupled with personal area network interlace 302. In an example embodiment, communications with the headset are established in a first session and communications with the external telephonic device are established in a second session. In another example embodiment, multiple personal area network interfaces 302 are employed, for example a first interface is coupled with a headset and the second interface with a desk phone.

The controller 404 is coupled with the BLUETOOTH transceiver 402, the wireless local area network interface 406, and the cellular telephone transceiver 408. The controller 404 suitably comprises logic for performing the functionality described herein.

In an example embodiment, the controller 404 is operable to selectively establish telephonic communications employing either the cellular telephone transceiver 408 and/or the external telephonic device via the WI-FI transceiver 406. When the cellular telephone network is employed to establish telephonic communications, audio data for the telephonic communications is relayed by the controller 404 between cellular network communicatively coupled with cellular network transceiver 408 and a headset communicatively coupled with BLUETOOTH transceiver 402. When the wireless local area network is employed to establish telephonic communications, audio data is relayed by the controller 404 between a headset coupled with BLUETOOTH transceiver 402 and an external telephone device communicatively coupled with the WI-FI transceiver 406. Note that the controller 404 can implement a conference call by establishing one call through cellular telephone interface 408 and a second call through the WI-FI transceiver 406. The controller 404 can mix audio data and provide the data from both calls to a headset coupled with the BLUETOOTH transceiver 402.

The WI-FI transceiver 406 may communicate directly with the external telephonic device, e.g., desk phone, or may communicate with the external telephonic device through an access point (AP) that is coupled with a network that can establish communications with the external telephonic device. In particular embodiments, the controller 404 establishes a VPN session with the external telephonic device.

In an example embodiment, communications via the BLUETOOTH transceiver 402 use less power than communications via the wireless WI-FI transceiver 406, which uses less power than communications via the cellular telephone interface 408. The controller 404 can be configured to select the available interface that employs the least amount of power for establishing telephonic communications. For example, if communications are available via the personal area network, then communications are established with an external telephonic device employing the BLUETOOTH transceiver 402. If a BLUETOOTH network is unavailable, or the controller 404 determines that congestion on a channel on the BLUETOOTH network is above a predefined threshold, then the controller 404 will establish telephonic communications with a wireless local area network (WLAN) via WI-FI transceiver 406. However, if the WLAN is unavailable, or congestion on the WLAN is above a predefined threshold, the controller 404 will select the cellular network for establishing telephonic communications.

This embodiment can be useful to a user with a mobile wireless telephonic device who wishes to share a headset between the mobile wireless telephonic device and a desk phone. For example, if in the office near a desk phone, the mobile wireless telephone 400 can employ the personal area network (e.g., BLUETOOTH) interface 302 for establishing communications using the desk phone. Audio data may be relayed to/from the desk phone with a headset communicatively coupled with personal area network interface 302. If the user walks away from the desk phone, but remains in a location where a wireless local area network such as WI-FI connection is available, the user can establish communications with the desk phone via the WI-FI transceiver 406. Audio data from the desk phone is relayed between the desk phone coupled with WI-FI transceiver 406 and the headset coupled with the BLUETOOTH transceiver 402 by the controller 404. Optionally, a VPN session may be established with the desk phone. For example if the mobile wireless device 400 is attached to an un-trusted or unsecure wireless local area network (for example a WI-FI hotspot), the mobile wireless device 400 may employ a VPN session to communicate with the desk phone. If a connection to the desk phone is unavailable, a telephone call may be placed through the cellular network.

In an example embodiment, the mobile wireless telephone device 400 further comprises a user interlace 406. User interlace 406 will enable an associated user to provide data to the controller 402 indicating which interface to use. For example, if a user desires to place a call, the user may select via the user interface whether to make the connection on a cellular network, or employ an external telephone such as a desk phone in communication with either the personal area network interface 302 and/or the wireless local area network interface 404.

Figure 5:
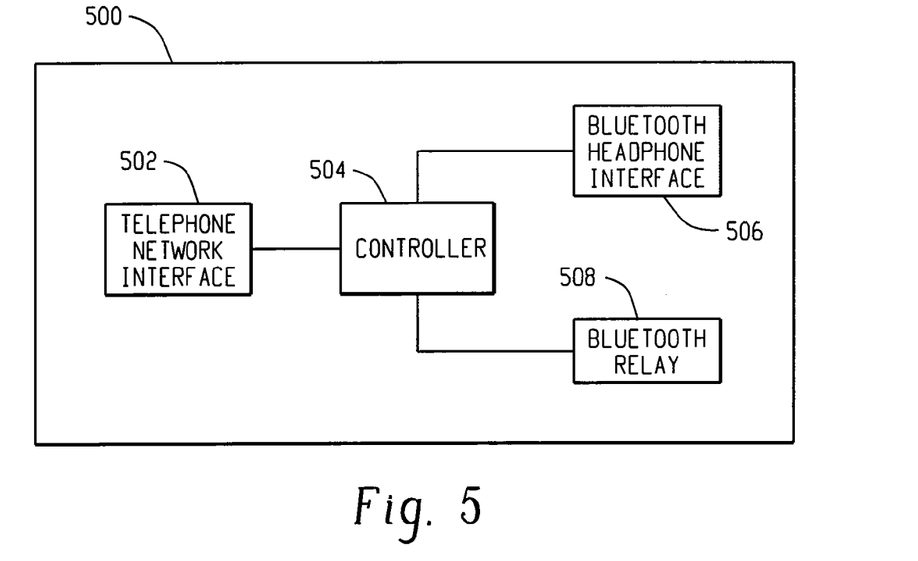
FIG. 5 is a block diagram illustrating an example of a telephone upon which an example embodiment can be implemented.

FIG. 5 is a block diagram illustrating an example of a telephone 500 with a wireless local area network interface 502. Telephone 500 suitably comprises a telephone network interface 502. The telephone network interface may be any suitable interface for establishing telephonic communications. For example, telephone network interface 502 may be coupled with a plain old telephone service (POTS) network or an IP network capable of providing VoIP communications.

Telephone network interface 502 is coupled with controller 504. The controller 504 suitably comprises logic for implementing the functionality of the example embodiments described herein.

A personal area network (BLUETOOTH in the illustrated example) interface 506 is coupled with the controller 504. This can allow pairing of a BLUETOOTH compatible headset with telephone 500. The controller 504 can relay audio data between telephone interface 502 and a headset coupled with personal area network interface 506.

BLUETOOTH relay logic 508 is coupled with controller 504. BLUETOOTH relay logic 508 can receive WI-FI signals, for example from a mobile wireless device in communication with telephone 500, and the controller can relay audio data from the WI-FI signals with telephone network interface 502 as if the signals were received from a BLUETOOTH headset coupled with the personal area network interface 506. The controller 504 can relay audio data received from telephone network interface 502 to the mobile wireless device employing the BLUETOOTH relay logic 508.

Note that in particular embodiments, the telephone 500 may include other options for sending and/or receiving data, such as audio data, associated with the telephone call. For example, the telephone 500 may further comprise a conventional handset (not shown), a wired headset (not shown) that can be plugged into a jack of the telephonic device, and/or a speakerphone interface (not shown). Thus, in addition to routing telephone call data (such as audio data) to either the BLUETOOTH headphone interface 506 or the BLUETOOTH relay 508, the controller 504 may also selectively route telephone call data to a conventional handset, wired headset, or speakerphone interface.

Figure 6:
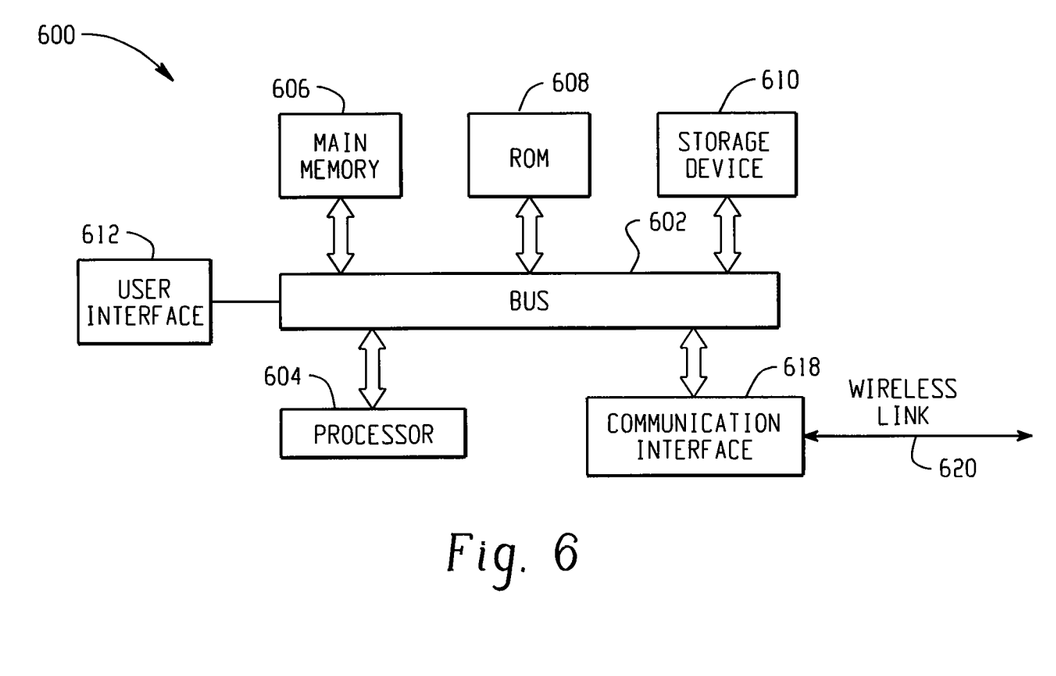
FIG. 6 is a block diagram illustrating an example of a computer system upon which an example embodiment can be implemented.

FIG. 6 is a block diagram illustrating an example of a computer system upon which an example embodiment can be implemented. Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a user interface 612. The user interface 612 may suitably comprise a visual output such as a cathode ray tube (CRT) or liquid crystal display (LCD), for displaying information to a computer user, an input device, such as a keyboard including alphanumeric and other keys is coupled a mouse, trackball, cursor direction keys, and/or a touch screen for communicating direction information and command selections to processor 604. The user interface may also suitably comprise an audio device input and/or output device such as a microphone and/or speaker respectively.

An aspect of the example embodiment is related to the use of computer system 600 for implementing a wireless cell phone headset relay. According to an example embodiment, implementing a wireless cell phone headset relay is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to non-volatile media, and volatile media. Non-volatile media include for example optical or magnetic disks, such as storage device 610. Volatile media include dynamic memory such as main memory 606. As used herein, tangible media may include volatile and non-volatile media. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 600 also includes a communication interface 618 coupled to bus 602. Communication interface 618 provides a two-way data communication coupling computer system 600 to a communication link 620 that provides the ability to communicate with an external device. As described herein, the external device may include a headset and/or another telephonic device.

Moreover, computer system 600 may suitably comprise a plurality of communication interfaces. For example, when employing computer system to implement controller 404 in FIG. 4, a first communication interface 618 is employed for WI-FI communications, a second communications interface 618 is employed for cellular communications, and a third communications interface (e.g., BLUETOOTH) 618 is employed for wireless communications with a headset.

Figure 7:
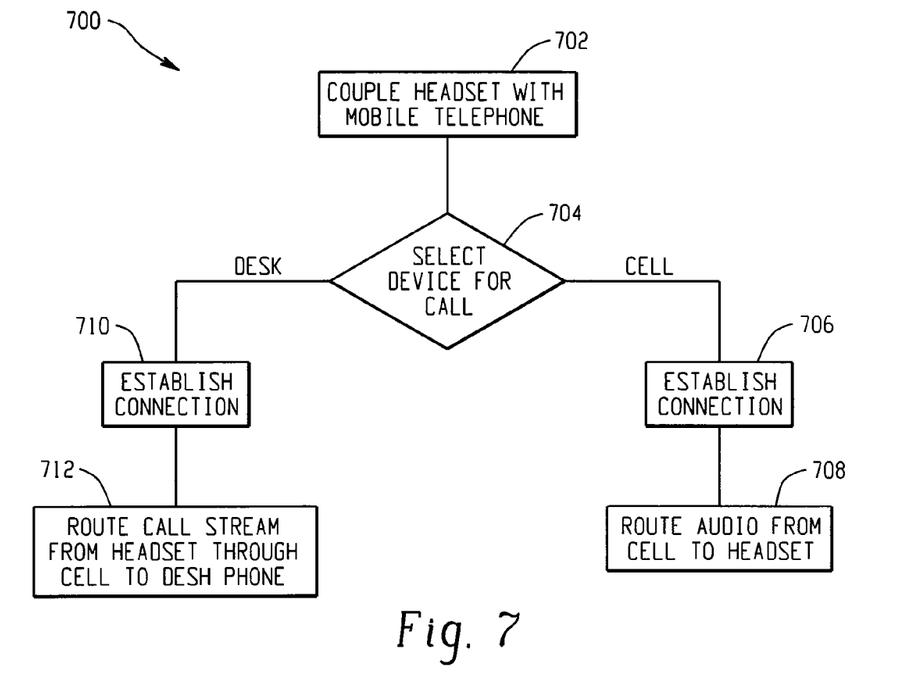
FIG. 7 is a block diagram of a methodology for a wireless mobile device to employ for sharing a headset with an external telephonic device.
Figure 8:
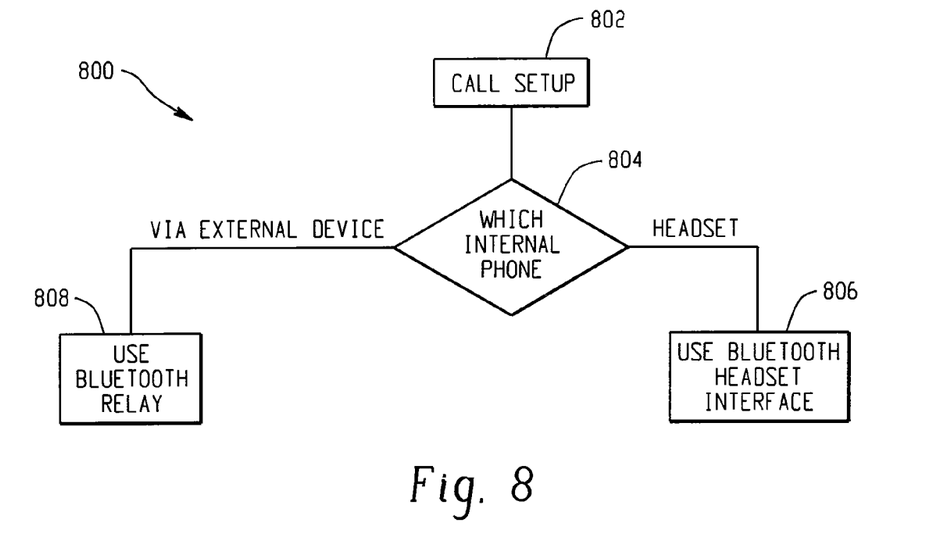
FIG. 8 is a block diagram of a methodology for a telephonic device to establish telephonic communications and route audio from the telephonic communications to an external wireless device.

In view of the foregoing structural and functional features described above, methodologies in accordance with example embodiments will be better appreciated with reference to FIGS. 7 and 8. While, for purposes of simplicity of explanation, the methodologies of FIGS. 7 and 8 are shown and described as executing serially, it is to be understood and appreciated that the example embodiments are not limited by the illustrated orders, as some aspects could occur in different orders and/or concurrently with other aspects from that shown and described herein. Moreover, not all of the illustrated features may be required to implement the methodologies described herein. The methodologies described herein are suitably adapted to be implemented in hardware, software, or a combination thereof.

FIG. 7 is a block diagram of a methodology 700 for a wireless mobile device to employ for sharing a headset with an external telephonic device. Methodology 700 may be implemented by wireless mobile device 104 (FIGS. 1 and 2), controller 304 (FIG. 3), controller 404 (FIG. 4) and/or processor 604 (FIG. 6).

At 702, communications are established between a mobile wireless device and a headset. For example, in a BLUETOOTH environment, the headset may be paired with the mobile wireless device. In an example embodiment, an external telephone, such as a desk phone may also be paired with the mobile wireless device.

At 704, a selection is made for how to establish telephonic communications. For example, a selection may be automatically made based on defaults programmed into the mobile wireless device, or a user interface may be employed to receive selection data. The mobile wireless device may be programmed to select the network employing the least amount of power. Alternatively, a user interface may be employed which can receive an input indicative of a selection. For example, a selection can be made to establish telephonic communications through an external desk phone that may be communicatively coupled with a BLUETOOTH or WI-FI connection. Alternatively, telephonic communications may be established employing a cellular network connection. In an example embodiment, the cellular interface is employed for telephonic communications when the external telephonic device is unavailable.

If, at 704, the selection was made to establish telephonic communications through the cellular network (CELL), at 706, communications are established via the cellular network by the mobile wireless device employing its cellular telephone interface. At 708, audio data from the telephone call received from the cellular network is routed through the mobile wireless device to the headset via the BLUETOOTH session. Audio data from the headset is routed by the mobile wireless device to the cellular network.

If, at 704, the selection was made to establish telephonic communications through the desk phone (DESK), at 710, communications are established by the desk phone. The phone call will handle call setup; however, audio data will be routed from the desk phone via the WI-FI session and relayed to the headset via the mobile wireless device. Audio data from the headset is routed by the mobile wireless device via the WI-FI session to the desk phone, which routes the audio data to the associated telephone network.

FIG. 8 is a block diagram of a methodology 800 for a telephonic device to establish telephonic communications and route audio from the telephonic communications to an external wireless device. Methodology 800 may be implemented by controller 504 (FIG. 5), and/or processor 604 (FIG. 6).

At 802, a call is setup. The call is setup over a telephone network such as a POTS network or an IP network (e.g., VoIP). The call may be initiated by a user associated with the phone or may be received by an interface coupled with the telephone network.

At 804, a determination is made for how to communicate with a headset. For example, a headset may be coupled with a BLUETOOTH interface or through a mobile wireless device such as a cellular phone or smart phone, which may employ either a BLUETOOTH connection or a WI-FI connection for communicating with the telephone. For example, while the headset and/or the mobile wireless device communicatively coupled with the headset is in close proximity to the phone, the headset may employ the BLUETOOTH interface for communicating with the phone while communications with the headset may employ the WI-FI connection if communications are unavailable through the BLUETOOTH interface.

If, at 804, a headset is determined to be directly coupled (e.g., not employing a mobile wireless device to relay audio data to the headset) with the telephone (HEADSET), at 806, communications are routed directly to the headset. For example, a BLUETOOTH session may be employed to couple the headset to the telephone and audio data between the telephone and headset is exchanged via the BLUETOOTH session.

If at 804, the headset is determined to be coupled to an external mobile wireless device, such as a mobile or smart phone employing a BLUETOOTH or WI-FI interface (USE EXTERNAL DEVICE), at 808, Bluetooth relay logic is employed to relay audio data to the mobile wireless device, and ultimately to the headset.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a personal area network interface;
a cellular telephone interface; and
a controller coupled with the personal area network interface and the cellular telephone interface;
wherein the controller is operable to communicate with a headset and with an external telephonic device via the personal area network interface;

wherein the controller is operable to selectively establish telephonic communications employing one of the group consisting of the cellular telephone interface and the external telephonic device via the personal area network interface, the personal area network interface communicating with the headset in a first session and with the external telephonic device in a second session;

wherein the controller determines congestion on a channel associated with the personal area network interface;

wherein the controller selects the cellular telephone interface to establish telephonic communications responsive to determining congestion on the channel associated with the personal area network is above a predefined threshold; and wherein data from the telephonic communications are routed by the controller to the headset via the personal area network interface while telephonic communications are established via the external telephonic device.

2. The apparatus of claim 1, wherein the personal area interface is a BLUETOOTH compatible interface.

3. The apparatus of claim 1, wherein the data from the telephonic communications comprises audio data.

4. The apparatus of claim 1, further comprising a user interface operable to receive data representative of whether telephonic communications should be established via the cellular telephone interface or via the external telephonic device.

5. The apparatus of claim 1, wherein the controller by default selects the personal area network interface for establishing telephonic communications when the personal area network interface is available.

6. An apparatus, comprising:
a personal area network interface for communicating with a headset;
a wireless local area network interface for communicating with an external telephonic device;
a cellular telephone interface; and
a controller coupled with the personal area network interface, the wireless local area network interface, and the cellular telephone interface;
wherein the controller is operable to selectively establish telephonic communications employing one of the group consisting of the cellular telephone interface and the external telephonic device via the wireless local area network interface;
wherein the controller determines congestion of a communications channel associated with the wireless local area network;
wherein the controller selects the cellular telephone interface to establish telephonic communications responsive to determining congestion on the channel associated with the wireless local area network interface is above a predefined threshold; and
wherein data from the telephonic communications are routed by the controller to the headset via the personal area network interface while telephonic communications are established via the external telephonic device.

7. The apparatus of claim 6, wherein the controller employs the wireless local area network interface to associate with an access point coupled with the external telephonic device via a network; and
wherein data from the telephonic communication is exchanged between the wireless local area network interface and the external telephonic device via the access point while telephonic communications are established via the telephonic device through the wireless local area network interface.

8. The apparatus of claim 6, wherein the controller establishes a virtual private network session with the external telephonic device while telephonic communications are established via the wireless local area network interface.

9. The apparatus of claim 6, wherein the controller establishes telephonic communications with the external telephonic device whenever the external telephonic device is available to save power.

10. The apparatus of claim 6, wherein the wireless local area network interface employs a WI-FI compatible protocol for communications.

11. The apparatus of claim 6, wherein the controller defaults to selecting the wireless local area network interface coupled with the external telephonic device for establishing telephonic communications when communication with the external telephonic device is available.

12. The apparatus of claim 6, wherein the personal area network interface communicates with the headset in a first session;
wherein the personal area network interface is further operable to communicate with the external telephonic device in a second session; and
wherein the controller is operable to selectively establish telephonic communications employing one of the group consisting of the cellular telephone interface, the external telephonic device via the wireless local area network interface, and the external telephonic device via the personal area network interface.

13. The apparatus of claim 12, wherein the controller selects the one of the group consisting of the cellular telephone interface, the external telephonic device via the wireless local area network interface, and the external telephonic device via the personal area network interface based on which of the cellular telephone interface, the external telephonic device via the wireless local area network interface, and the external telephonic device via the personal area network device can establish telephonic communications using a least amount of power.

14. A method, comprising:
pairing over a personal area network interface with a headset;
pairing over the personal area network interface with an external telephonic device;
enabling a cellular interface and the external telephonic device to establish telephonic communications; and
establishing telephonic communications with the headset, the cellular interface and the telephonic device;
wherein audio data from the telephonic communications is routed among the headset, the cellular interface and the external telephonic device while the concurrent communications are established via the external telephonic device.

15. The method set forth in claim 14, wherein the cellular interface is employed for telephonic communications when the external telephonic device is unavailable.

16. Logic encoded in a non-transitory computer readable medium for execution by a processor, and when executed operable to:
communicate with a headset employing a wireless personal area network protocol;
communicate with an external telephonic device employing a wireless local area network protocol;
communicate with a cellular interface employing a cellular protocol;
selectively establish telephonic communications through the external telephonic device, the headset and cellular interface; and route data from the telephonic communications among the headset, the external telephonic device and the headset.

17. The logic of claim 16, further operable to receive data for which one of the group consisting of the external telephonic device and cellular interface to select.

18. The logic of claim 16, further operable to associating with an access point coupled with the external telephonic device via the wireless local area network protocol.

19. Logic encoded in a non-transitory computer readable medium for execution by a processor and when executed operable to:
   communicate audio data from a telephonic communication with a wireless headset via a first session;
   communicate audio data from a second telephonic communication with the wireless headset via an associated mobile wireless device in a second session; and
   communicate audio data from a third telephonic communication with the wireless headset in a second session; and
   initiate a three-way communication session inclusive of the first, second and third sessions.

20. The logic set forth in claim 19, wherein the first session employs a personal area network protocol; and
   wherein the second session employs a wireless local area network protocol.

* * * * *

UNITED STATES PATENT AND TRADEMARK OFFICE
CERTIFICATE OF CORRECTION

PATENT NO. : 8,694,054 B2  
APPLICATION NO. : 13/228236  
DATED : April 8, 2014  
INVENTOR(S) : Michael E. Tasker Page 1 of 1

It is certified that error appears in the above-identified patent and that said Letters Patent is hereby corrected as shown below:

In the Drawings:

Sheet 3, Fig. 6, at Reference Numeral 620, "wireless" should read "communication".

Sheet 4, Fig. 7, at Reference Numeral 712, "desh" should read "desk".

In the Specification:

Column 5, line 33, "304" should read "302".

Column 7, line 23, "406" should read "410".

Column 7, line 24, "406" should read "410".

Column 7, line 25, "402" should read "404".

Column 7, line 30, "404" should read "406".

In the Claims:

In claim 2, Column 11, line 20, after "area" insert -- "network" --.

In claim 16, Column 13, line 2, delete "headset" and replace it with -- "cellular interface" --.

In claim 19, Column 13, line 18, delete "second" and replace it with -- "third" --.

Signed and Sealed this  
Nineteenth Day of August, 2014

Michelle K. Lee  
*Deputy Director of the United States Patent and Trademark Office*